(12) United States Patent
Gim

(10) Patent No.: US 11,275,694 B2
(45) Date of Patent: Mar. 15, 2022

(54) MEMORY SYSTEM AND METHOD OF OPERATING METHOD THEREOF

(71) Applicant: SK hynix Inc., Gyeonggi-do (KR)

(72) Inventor: Yeong Dong Gim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 0 days.

(21) Appl. No.: 17/032,159

(22) Filed: Sep. 25, 2020

(65) Prior Publication Data

US 2022/0012181 A1 Jan. 13, 2022

(30) Foreign Application Priority Data

Jul. 10, 2020 (KR) .................. 10-2020-0085362

(51) Int. Cl.
*G06F 12/00* (2006.01)
*G06F 12/10* (2016.01)

(52) U.S. Cl.
CPC ...... *G06F 12/10* (2013.01); *G06F 2212/1032* (2013.01); *G06F 2212/1041* (2013.01)

(58) Field of Classification Search
CPC ............. G06F 12/10; G06F 2212/1032; G06F 2212/1041
See application file for complete search history.

(56) References Cited

U.S. PATENT DOCUMENTS

| 5,193,153 A | 3/1993 | Soutoul |
| 2013/0054880 A1* | 2/2013 | Chang ................. G06F 12/0246 711/103 |
| 2015/0347029 A1* | 12/2015 | Kotte .................... G06F 3/0688 711/103 |

FOREIGN PATENT DOCUMENTS

KR 10-0281132 2/2001

* cited by examiner

*Primary Examiner* — Gurtej Bansal
(74) *Attorney, Agent, or Firm* — IP & T Group LLP

(57) ABSTRACT

An operating method of a memory system that includes a memory device including a plurality of blocks and a controller including a memory in which a first open block list and a second open block list are stored, the method comprising receiving a write request and a logical address from a host; converting the logical address into a first virtual address; converting the first virtual address into a physical address; performing a first error checking operation of checking a mapping relationship between the first virtual address and the physical address based on the first open block list; performing a second error checking operation of checking whether the physical address is included in the second open block list; and performing a write operation on an open block corresponding to the physical address when it is determined that the physical address is not allocated more than once.

20 Claims, 11 Drawing Sheets

FIG. 4A

| Logical Address - to - First Virtual Address ||
|---|---|
| Logical Address | Virtual Block : Offset |
| LA_1 | VA_1:51 |

FIG. 4B

| First Virtual Address -to- Physical Address ||
|---|---|
| Virtual Block : Offset | Physical Block : Page |
| VA_1:51 | PA_10:5 |

FIG. 4C

| Physical Address – to – Second Virtual Address ||
|---|---|
| Physical Block : Page | Virtual Block : Offset |
| PA_10:5 | VA_1:51 |

FIG. 5

| First Open Block List ||
|---|---|
| Virtual Open Block | Virtual Open Offset |
| VA_1 | 50 → 51 |
| VA_2 | 20 |
| VA_3 | 4 |

FIG. 6

| Second Open Block List ||
|---|---|
| Physical Open Block | Page |
| PA_1 | 5 |
| PA_10 | 4 |
| PA_20 | 20 |

MEMORY SYSTEM AND METHOD OF OPERATING METHOD THEREOF

CROSS-REFERENCE TO RELATED APPLICATION(S)

The present application claims priority under 35 U.S.C. § 119(a) to Korean Patent Application No. 10-2020-0085362, filed on Jul. 10, 2020, the disclosure of which is incorporated herein by reference in its entirety.

BACKGROUND

1. Field

Various embodiments of the present disclosure generally relate to a semiconductor device. Particularly, the embodiments relate to a memory system including a nonvolatile memory cell, and an operating method thereof.

2. Description of the Related Art

Recently, the paradigm for the computing environment has changed to ubiquitous computing in which computer systems can be used anytime, anywhere. Therefore, the use of portable electronic devices such as mobile phones, digital cameras, and notebook computers has rapidly increased. Such a portable electronic device generally uses a memory system including a memory device, such as a data storage device. The data storage device is used as a main or secondary memory device of the portable electronic device.

Since the data storage device including a nonvolatile memory device has no mechanical driving unit (e.g., a mechanical arm with a read/write head) as compared with a hard disk device, the data storage device has excellent stability and durability, fast data access rate, and low power consumption. The data storage device having such advantages may include any of a universal serial bus (USB) memory device, a memory card having various interfaces, and a solid state drive (SSD).

SUMMARY

Various embodiments of the present disclosure are directed to a memory system that determines whether there is an error in a write address and performs an address remapping operation when the error occurs, before performing a write operation on a memory device in response to a write request received from a host, and an operating method of the memory system.

In accordance with an embodiment, a memory system comprising: a memory device including a plurality of blocks; and a controller suitable for performing a write operation on an open block among the plurality of blocks in correspondence with a write request and a logical address received from a host, and including a memory in which a first open block list including one or more pieces of virtual open block information and a second open block list including one or more pieces of physical open block information are stored, wherein, before performing the write operation, the controller converts the logical address into a first virtual address, converts the first virtual address into a physical address, performs a first error checking operation of checking a mapping relationship between the first virtual address and the physical address based on the first open block list and a second error checking operation of checking whether the physical address is included in the second open block list, in order to check whether the physical address is allocated more than once, wherein the controller then performs the write operation on the physical open block corresponding to the physical address when it is determined that the physical address is not allocated more than once.

In accordance with an embodiment, an operating method of a memory system that includes a memory device including a plurality of blocks and a controller including a memory in which a first open block list of one or more pieces of virtual open block information and a second open block list of one or more pieces of physical open block information are stored, the operating method comprising: receiving a write request and a logical address from a host; converting the logical address into a first virtual address; converting the first virtual address into a physical address; performing a first error checking operation of checking a mapping relationship between the first virtual address and the physical address based on the first open block list; performing a second error checking operation of checking whether the physical address is included in the second open block list; and performing a write operation on an open block corresponding to the physical address when it is determined that the physical address is not allocated more than once.

In accordance with an embodiment, a memory system comprising: a memory device including a plurality of memory blocks; a memory suitable for storing first and second lists listing a most recently programmed page in each open memory block among the memory blocks; and a control component suitable for controlling the memory device to program data into a target page, which is indicated as subsequent to a most recently programmed page in the second list, when the target page is indicated as subsequent to a most recently programmed page listed in the first list, wherein the most recently programmed pages in the respective first and second lists are represented by addresses of different types.

BRIEF DESCRIPTION OF THE DRAWINGS

FIGS. 4A to 4C are diagrams illustrating address conversion tables in accordance with an embodiment of the disclosure.

FIG. 5 is a diagram illustrating a first open block list in accordance with an embodiment of the disclosure.

FIG. 6 is a diagram illustrating a second open block list in accordance with an embodiment of the disclosure.

DETAILED DESCRIPTION

Various embodiments of the invention are described below in more detail with reference to the accompanying drawings. It is noted, however, that the invention may be embodied in different forms. Moreover, aspects and features of the present invention may be configured or arranged differently than shown in the illustrated embodiments. Thus, the present invention is not limited to the embodiments set forth herein. Rather, the described embodiments are provided so that this disclosure is thorough and complete and fully conveys the present invention to those skilled in the art to which this invention pertains. Also, throughout the specification, reference to "an embodiment," "another embodiment" or the like is not necessarily to only one embodiment, and different references to any such phrase are not necessarily to the same embodiment(s).

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present. Communication between two elements, whether directly or indirectly connected/coupled, may be wired or wireless, unless stated or the context indicates otherwise.

As used herein, singular forms may include the plural forms as well and vice versa, unless the context clearly indicates otherwise. The articles 'a' and 'an' as used in this application and the appended claims should generally be construed to mean 'one or more' unless specified otherwise or clear from context to be directed to a singular form.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Various embodiments of the present invention are described in detail below with reference to the attached drawings.

Figure 1:
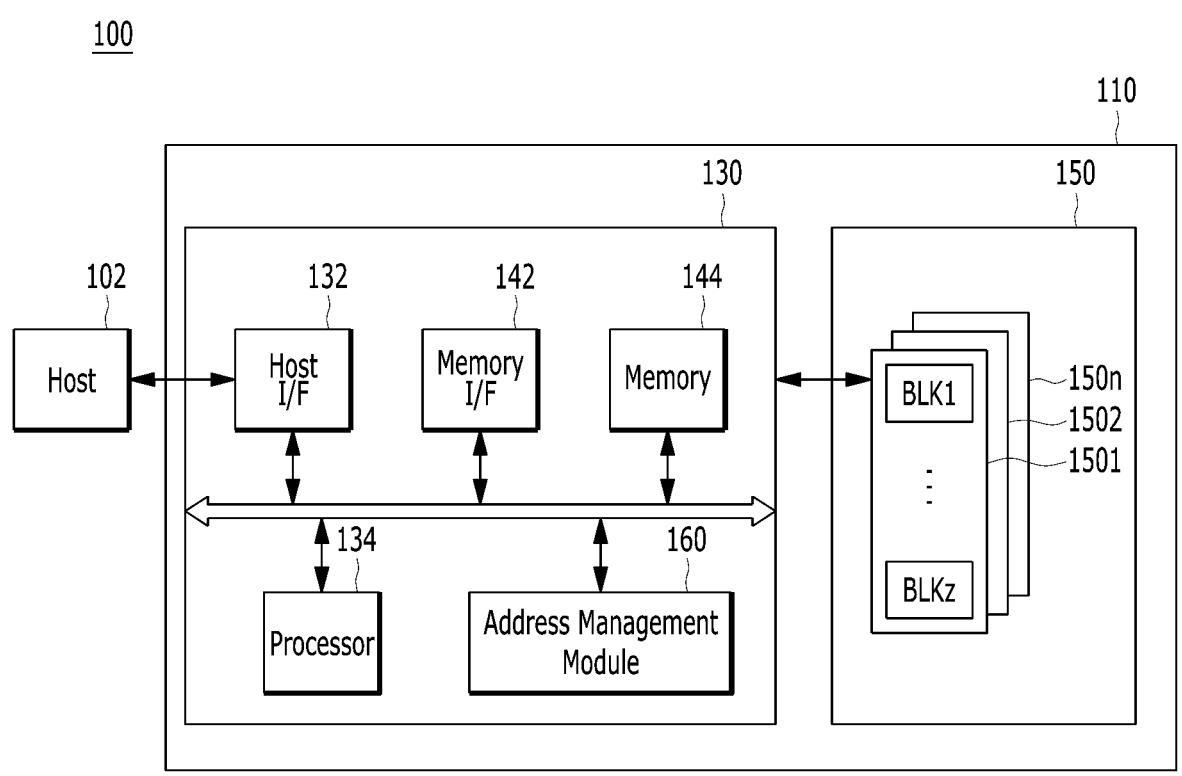
FIG. 1 is a block diagram illustrating a data processing system including a memory system in accordance with an embodiment of the present invention.

FIG. 1 is a block diagram illustrating a data processing system 100 including a memory system in accordance with an embodiment.

Referring to FIG. 1, the data processing system 100 may include a host 102 and a memory system 110.

The host 102 may be embodied by any of various electronic devices, for example, portable electronic devices such as a mobile phone, an MP3 player and a laptop computer or non-portable electronic devices such as a desktop computer, a game machine, a television (TV) and a projector, that is, wired and wireless electronic devices.

The host 102 includes at least one operating system (OS). The operating system generally manages and controls the functions and operations of the host 102, and provides interoperability between the host 102 and a user using the data processing system 100 or the memory system 110. The operating system supports functions and operations corresponding to the user's purpose of use and the use of the operating system. For example, the operating system may be a general operating system or a mobile operating system depending on the mobility of the host 102. The general operating system may be a personal operating system or an enterprise operating system depending on the user's usage environment. For example, the personal operating system configured to support a service providing function for a general user may include Windows and Chrome, and the enterprise operating system configured to secure and support high performance may include Windows server, Linux and Unix. The mobile operating system configured to support a mobility service providing function and a system power saving function to users may include Android, iOS, Windows mobile, etc. The host 102 may include a plurality of operating systems, and executes the operating systems to perform operations with the memory system 110 in correspondence to a user request. The host 102 transmits a plurality of commands corresponding to a user request to the memory system 110, and accordingly, the memory system 110 performs operations corresponding to the commands, that is, operations corresponding to the user request.

The memory system 110 operates in response to a request of the host 102, and, in particular, stores data to be accessed by the host 102. In other words, the memory system 110 may be used as a main memory device or an auxiliary memory device of the host 102. The memory system 110 may be implemented as any of various kinds of storage devices, depending on a host interface protocol, i.e., communication protocol, with the host 102. For example, the memory system 110 may be implemented as any of a solid state driver (SSD), a multimedia card (e.g., an MMC, an embedded MMC (eMMC), a reduced size MMC (RS-MMC) and a micro-MMC), a secure digital card (e.g., an SD, a mini-SD and a micro-SD), a universal serial bus (USB) storage device, a universal flash storage (UFS) device, a compact flash (CF) card, a smart media card, and a memory stick.

Any of the storage devices which implement the memory system 110 may be a volatile memory device such as a dynamic random access memory (DRAM) and/or a static random access memory (SRAM), or a nonvolatile memory device such as a read only memory (ROM), a mask ROM (MROM), a programmable ROM (PROM), an erasable programmable ROM (EPROM), an electrically erasable and programmable ROM (EEPROM), an ferroelectric random access memory (FRAM), a phase change RAM (PRAM), a magnetic RAM (MRAM) and/or a resistive RAM (RRAM).

The memory system 110 includes a controller 130 and a memory device 150 which stores data to be accessed by the host 102. The controller 130 controls storage of data in the memory device 150.

The controller 130 and the memory device 150 may be integrated into one semiconductor device. For instance, the controller 130 and the memory device 150 may be integrated into one semiconductor device and configure a solid state drive (SSD). In the case where the memory system 110 is used as an SSD, the operating speed of the host 102 which is coupled to the memory system 110 may be improved. The controller 130 and the memory device 150 may be integrated into one semiconductor device to form a memory card such as a personal computer memory card international association (PCMCIA) card, a compact flash (CF) card, a smart media card (e.g., an SM and an SMC), a memory stick, a multimedia card (e.g., an MMC, an RS-MMC and a micro-MMC), a secure digital card (e.g., an SD, a mini-SD, a micro-SD and an SDHC), and/or a universal flash storage (UFS) device.

In another embodiment, the memory system 110 may be disposed in a computer, an ultra mobile PC (UMPC), a workstation, a net-book, a personal digital assistant (PDA), a portable computer, a web tablet, a tablet computer, a wireless phone, a mobile phone, a smart phone, an e-book, a portable multimedia player (PMP), a portable game player, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage configuring a data center, a device capable of transmitting and receiving information under a wireless environment, one of various electronic devices configuring a home network, one of various electronic devices configuring a computer network, one of various electronic devices configuring a telematics network, a radio frequency identification (RFID) device, or one of various circuitry elements configuring a computing system.

The memory device 150 may retain stored data even though power is not supplied. In particular, the memory device 150 stores the data provided from the host 102 through a write operation, and provides stored data to the host 102 through a read operation. The memory device 150 includes a plurality of memory dies 1501 to 150n.

Each of the plurality of memory dies 1501 to 150n includes a plurality of memory blocks BLK1 to BLKz, each of which includes a plurality of pages. Each of the pages includes a plurality of memory cells to which a plurality of word lines (WL) are coupled. The memory device 150 includes a plurality of planes, each of which includes a plurality of memory blocks, e.g., memory blocks BLK1 to BLKz. In particular, the memory device 150 may include a plurality of memory dies 1501 to 150n, each of which includes a plurality of planes. The memory device 150 may be a nonvolatile memory device, for example, a flash memory. The flash memory may have a three-dimensional (3D) stack structure.

The controller 130 controls the memory device 150 in response to a request from the host 102. For example, the controller 130 provides the data read from the memory device 150, to the host 102, and stores the data provided from the host 102, in the memory device 150. To this end, the controller 130 controls the operations of the memory device 150, such as read, write, program and erase operations.

The controller 130 includes a host interface (I/F) 132, a processor 134, a memory interface (I/F) 142, a memory 144 and an address management module 160.

The host interface 132 may handle commands, data, and the like received from the host 102. By way of example but not limitation, the host interface 132 may include a command queue.

The host interface 132 processes the commands and data of the host 102, and may be configured to communicate with the host 102 through at least one of various interface protocols such as universal serial bus (USB), multimedia card (MMC), peripheral component interconnect express (PCI-e or PCIe), serial attached SCSI (SAS), serial advanced technology attachment (SATA), parallel advanced technology attachment (PATA), small computer system interface (SCSI), enhanced small disk interface (ESDI), integrated drive electronics (IDE) and mobile industry processor interface (MIPI). The host interface 132 may be driven through firmware referred to as a host interface layer (HIL), which is a region which exchanges data with the host 102.

The memory interface 142 serves as a memory interface and/or storage interface which performs interfacing between the controller 130 and the memory device 150 to allow the controller 130 to control the memory device 150 in response to a request from the host 102. The memory interface 142 generates control signals for the memory device 150 and processes data according to the control of the processor 134, as a NAND flash controller (NFC) in the case where the memory device 150 is a flash memory, and more particularly, a NAND flash memory. The memory interface 142 may support the operation of an interface which processes a command and data between the controller 130 and the memory device 150, for example, a NAND flash interface, in particular, data input/output between the controller 130 and the memory device 150. The memory interface 142 may be driven through firmware, referred to as a flash interface layer (FIL), which is a region which exchanges data with the memory device 150.

The memory 144, as the working memory of the memory system 110 and the controller 130, stores data for driving of the memory system 110 and the controller 130. When the controller 130 controls the memory device 150 in response to a request from the host 102, the controller 130 may provide data read from the memory device 150 to the host 102, and/or store data provided from the host 102 in the memory device 150. To this end, when the controller 130 controls the operations of the memory device 150, such as read, write, program and erase operations, the memory 144 stores data needed to allow such operations to be performed by the memory system 110, that is, between the controller 130 and the memory device 150.

The memory 144 may be realized by a volatile memory. For example, the memory 144 may be realized by a static random access memory (SRAM) or a dynamic random access memory (DRAM). Furthermore, the memory 144 may be disposed within the controller 130 as shown in FIG. 1. Alternatively, the memory 144 may be external to the controller 130, and in this regard, may be realized as a separate external volatile memory in communication with the controller 130 through a memory interface.

As described above, the memory 144 stores data to perform read and write operations between the host 102 and the memory device 150 and data when performing the data read and write operations. For such data storage, the memory 144 includes a program memory, a data memory, a write buffer/cache, a read buffer/cache, a data buffer/cache, a map buffer/cache, and the like.

The processor 134 controls various operations of the memory system 110. In particular, the processor 134 controls a program operation or a read operation for the memory device 150, in response to a write request or a read request from the host 102. The processor 134 drives firmware, referred to as a flash translation layer (FTL), to control the general operations of the memory system 110. The processor 134 may be more than one processor, each of which may be realized by a microprocessor or a central processing unit (CPU).

For instance, the controller 130 performs an operation requested from the host 102, in the memory device 150, that is, performs a command operation corresponding to a command received from the host 102, with the memory device 150, through the processor 134. The controller 130 may perform a foreground operation as a command operation corresponding to a command received from the host 102. For example, the foreground operation includes a program operation corresponding to a write command, a read operation corresponding to a read command, an erase operation corresponding to an erase command or a parameter set operation corresponding to a set parameter command or a set feature command as a set command.

Herein, the address management module 160 checks an error of an address to prevent duplicate allocation of a physical address, before performing a write operation in response to a write request received from the host 102. That is, in order to perform the write operation in response to the write request received from the host 102, the address management module 160 converts a logical address included in the write request into a virtual address, and converts the virtual address into an actual physical address of the memory device 150. To prevent duplicate allocation of the virtual address and the physical address, the address management module 160 checks a mapping relationship between the virtual address and the physical address by performing an inverse conversion, that is, converting the physical address into a virtual address, and then checks whether the physical address is actually allocated as a physical address of a free or empty page in an open block, and thus prevents duplicate allocation of the virtual address and the physical address. This functionality of the address management module 160 is described in detail with reference to FIG. 3.

Embodiments of the disclosure provide a memory system including at least one processor, e.g., processor 134, and at least one storage device, e.g., memory 144, including program commands, which memory system is operably coupled with a host.

Figure 2:
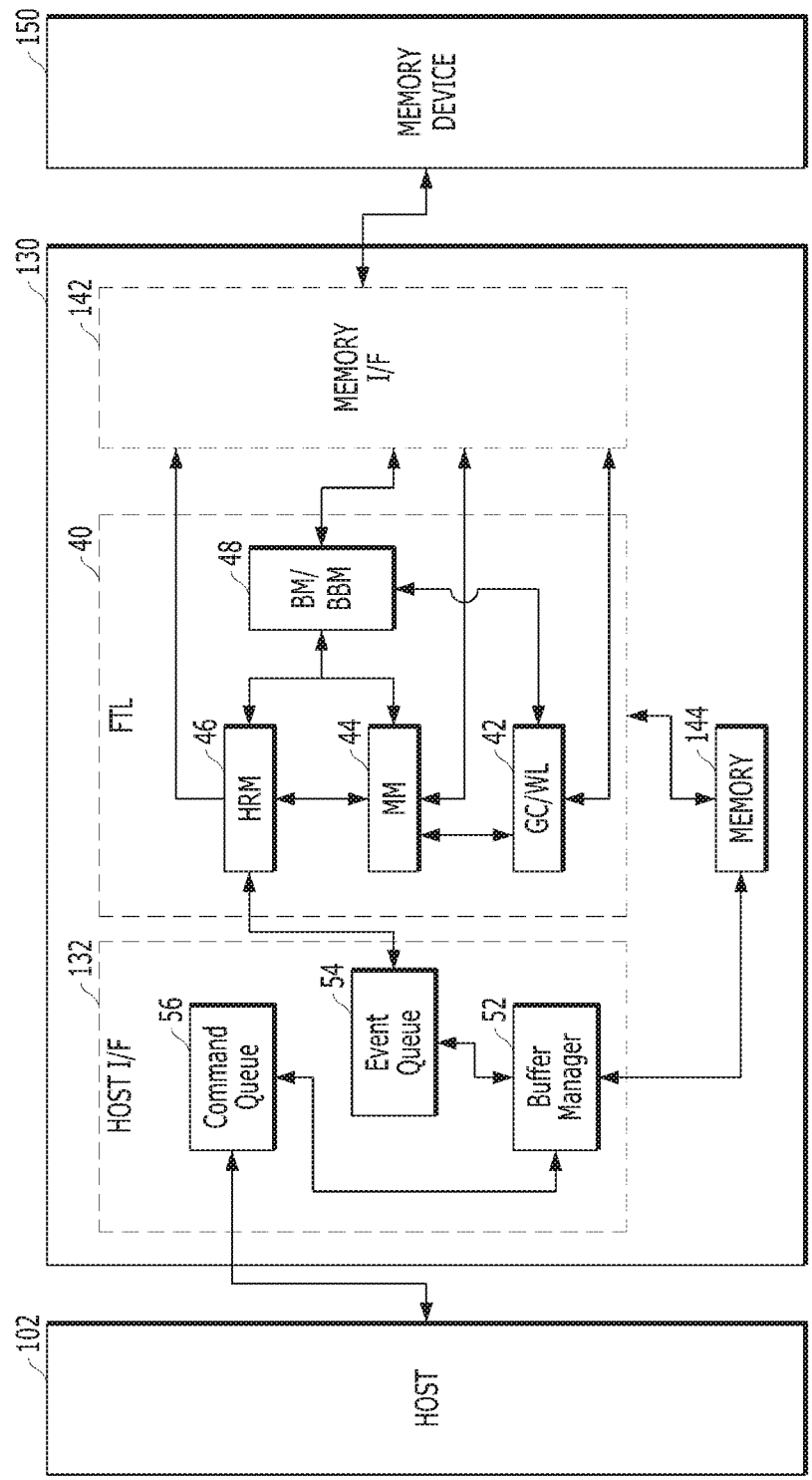
FIG. 2 illustrates a memory system according to an embodiment of the present disclosure.

FIG. 2 illustrates a memory system according to an embodiment of the present disclosure. Referring to FIG. 2, the memory system includes a controller 130 and a memory device 150. The controller 130 cooperates with a host 102 and the memory device 150. The controller 130 may include a host interface (I/F) 132, flash translation layer (FTL) circuitry 40, a memory interface (I/F) 142, and a memory 144.

The host interface 132 may handle commands and data from the host 102. By way of example but not limitation, the host interface 132 may include a command queue 56, a buffer manager 52 and an event queue 54. The command queue 56 may sequentially store commands and data from the host 102 and output them to the buffer manager 52 in the order in which the commands are stored. The buffer manager 52 may classify, manage, or adjust the commands and the data, which are delivered from the command queue 56. The event queue 54 may sequentially transmit events for processing the commands and the data received from the buffer manager 52.

A plurality of commands or data of the same characteristic may be received from the host 102, or commands and data of different characteristics may be transmitted to the memory system after being mixed or jumbled. For example, a plurality of commands for reading data (i.e., read commands) may be delivered, or read commands and program/write commands may be alternately transmitted to the memory system. The host interface 132 may store commands and data, which are received from the host 102, to the command queue 56 sequentially. Thereafter, the host interface 132 may estimate or predict what kind of internal operation the controller 130 will perform according to the characteristics, e.g., type, of the command and data, which is received from the host 102. The host interface 132 may determine a processing order and a priority of commands and data, based at least on their characteristics. According to characteristics of commands and data, from the host 102, the buffer manager 52 in the host interface 132 is configured to determine whether the buffer manager 52 should store commands and data in the memory 144, or whether the buffer manager 52 should deliver the commands and the data to the flash translation layer (FTL) circuitry 40. The event queue 54 receives events from the buffer manager 52, which events are to be internally executed and processed by the memory system or the controller 130 in response to the commands and the data from the host 102, so as to deliver the events to the flash translation layer (FTL) circuitry 40 in the order received.

In accordance with an embodiment, the flash translation layer (FTL) circuitry 40 may include a state manager (GC/WL) 42, a map manager (MM) 44, a host request manager (HRM) 46, and a block manager (BM/BBM) 48. The host request manager 46 may manage the events received from the event queue 54. The map manager 44 may handle or control map data. The state manager 42 may perform garbage collection (GC) or wear leveling (WL). The block manager 48 may execute commands or instructions onto a block in the memory device 150.

By way of example but not limitation, the host request manager 46 may use the map manager 44 and the block manager 48 to handle or process requests according to the read and program commands, and events which are delivered from the host interface 132. The host request manager 46 may send an inquiry or request to the map manager 44 to determine a physical address corresponding to the logical address which is received with the events. The host request manager 46 may send a read request with the physical address to the memory interface 142, to process the read request (i.e., handle the events). On the other hand, the host request manager 46 may send a program request (or write request) to the block manager 48 to program received data to an empty page (i.e., a page having no data) in the memory device 150, and then, may transmit a map update request corresponding to the program request to the map manager 44, thereby updating mapping addresses.

Here, the block manager 48 may convert a program request delivered from the host request manager 46, the map manager 44, and/or the state manager 42 into a flash program request used for the memory device 150, to manage flash blocks in the memory device 150. In order to enhance program or write performance of the memory system, the block manager 48 may collect program requests and send flash program requests for multiple-plane and one-shot program operations to the memory interface 142. The block manager 48 may send several flash program requests to the memory interface 142 to enhance parallel processing of the multi-channel and multi-directional flash controller.

The block manager 48 may be configured to manage blocks in the memory device 150 according to the number of valid pages, select and erase blocks having no valid pages when a free block is needed, and select a block including the least number of valid pages when it is determined that garbage collection is necessary or desirable. The state manager 42 may perform garbage collection to move the valid data to an empty block and erase remaining data in the blocks from which the valid data was moved so that the block manager 48 may have enough free blocks (i.e., empty blocks with no data). If the block manager 48 provides information regarding a block to be erased to the state manager 42, the state manager 42 is able to check all flash pages of the block to be erased to determine whether each page is valid.

For example, to determine validity of each page, the state manager 42 may identify a logical address stored in an out-of-band (OOB) area of each page. To determine whether each page is valid or not, the state manager 42 may compare the physical address of the page with the physical address mapped to the logical address obtained from the request. The state manager 42 sends a program request to the block manager 48 for each valid page. A mapping table may be updated through the update of the map manager 44 when the program operation is complete.

The map manager 44 may manage a logical-to-physical mapping table. The map manager 44 may process requests such as queries and updates, which are generated by the host request manager 46 or the state manager 42. The map manager 44 may store the entire mapping table in the memory device 150 (e.g., a flash/non-volatile memory) and cache mapping entries according to the storage capacity of the memory 144. When a map cache miss occurs while processing inquiry or update requests, the map manager 44 may send a read request to the memory interface 142 to load a relevant mapping table stored in the memory device 150. When the number of dirty cache blocks in the map manager 44 exceeds a certain threshold, a program request may be sent to the block manager 48 so that a clean cache block is made and the dirty map table may be stored in the memory device 150.

When garbage collection is performed, the state manager 42 copies valid page(s) into a free block, and the host request manager 46 may program the latest version of the data for the same logical address of the page and currently issue an update request. When the state manager 42 requests the map update in a state in which copying of valid page(s) has not been completed, the map manager 44 may not perform the mapping table update. This is because the map request is issued with old physical information if the state manger 42 requests a map update and a valid page copy is not completed until later. The map manager 44 may perform a map update operation to ensure accuracy only if the latest map table still points to the old physical address.

According to an embodiment, at least one of the state manager 42, the map manager 44 and the block manager 48 may include a garbage collection module (GCM) and a map data manager. For example, at least one of the state manager 42, the map manager 44 and the block manager 48 may perform a background operation autonomously, i.e., without a corresponding command transmitted from the host interface 132.

The memory interface 142 may serve as an interface for handling commands and data transferred between the controller 130 and the memory device 150 in order to allow the controller 130 to control the memory device 150 in response to a request delivered from the host 102. The memory interface 142 may generate a control signal for the memory device 150 and may process write data to be written in the memory device 150 or read data outputted from the memory device 150 under the control of the processor 134 when the memory device 150 is a flash memory, and more particularly, a NAND flash memory. The memory interface 142 may provide operations of a NAND flash interface between the controller 130 and the memory device 150. In accordance with an embodiment, the memory interface 142 may be implemented with firmware called a flash interface layer (FIL) as a component for exchanging data with the memory device 150.

The memory device 150 may include a plurality of memory blocks. Each of the plurality of memory blocks may be a single level cell (SLC) memory block or a multi-level cell (MLC) memory block, according to the number of bits that can be stored or represented in one memory cell of such block. Here, the SLC memory block includes a plurality of pages implemented by memory cells, each storing one bit of data. The SLC memory block can have high data I/O operation performance and high durability. The MLC memory block includes a plurality of pages implemented by memory cells, each storing multi-bit data (e.g., two bits or more). The MLC memory block can have a greater storage capacity for the same space compared to the SLC memory block. The MLC memory block can be highly integrated in terms of storage capacity. In an embodiment, the memory device 150 may be implemented with MLC memory blocks, such as double level cell memory blocks, triple level cell (TLC) memory blocks, quadruple level cell (QLC) memory blocks or a combination thereof. The double level memory block may include a plurality of pages implemented by memory cells, each capable of storing 2-bit data. The triple level cell (TLC) memory block may include a plurality of pages implemented by memory cells, each capable of storing 3-bit data. The quadruple level cell (QLC) memory block may include a plurality of pages implemented by memory cells, each capable of storing 4-bit data. In another embodiment, the memory device 150 may be implemented with blocks, each including a plurality of pages implemented by memory cells, each capable of storing 5 or more bits of data.

In an embodiment of the present disclosure, the memory device 150 is a nonvolatile memory such as a flash memory, that is, a NAND flash memory, a NOR flash memory, or the like. In another embodiment, the memory device 150 may be at least one of a phase change random access memory (PCRAM), a ferroelectrics random access memory (FRAM), a spin injection magnetic memory (e.g., a spin transfer torque magnetic random access memory (STT-MRAM)), and the like.

Figure 3:
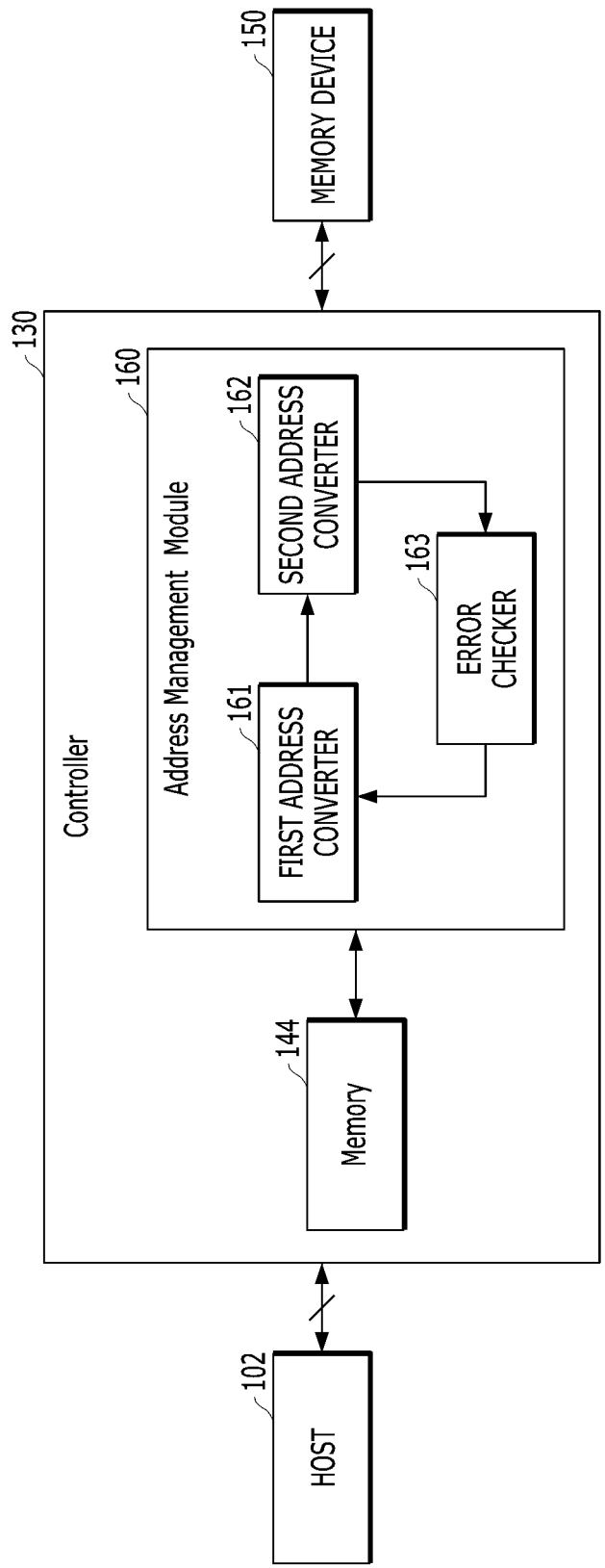
FIG. 3 is a diagram specifically illustrating an address management module according to an embodiment.

FIG. 3 is a diagram specifically illustrating the address management module 160 according to an embodiment.

Referring to FIG. 3, the address management module 160 may include a first address converter 161, a second address converter 162 and an error checker 163. The first address converter 161 may be driven by the processor 134 of FIG. 1, and the second address converter 162 and the error checker 163 may be driven through the memory interface 142 of FIG. 1.

Whenever receiving a write request and a logical address from the host 102, the first address converter 161 may convert the received logical address into a first virtual address corresponding to the logical address. In addition, the first address converter 161 may store the logical address and the first virtual address in a first temporary map table included in the memory 144. The first virtual address represents a virtual physical storage space allocated in correspondence with the logical address received from the host 102, and may include a virtual block number and a virtual offset number (VA_virtual block: virtual offset). That is, the first virtual address is converted from the logical address. For example, referring to FIG. 4A, it may be seen that, when the logical address included in the write request received from the host 102 is "LA_1", a first virtual address "VA_1:51" obtained through the conversion of the logical address has been stored in the first temporary map table. That is, it may be seen that the first address converter 161 converts the logical address "LA_1" into the first virtual address having the virtual block number of 1 and the virtual offset number of 51.

The first address converter 161 updates a virtual open block and a virtual open offset of a first open block list included in the memory 144 based on the converted first virtual address. Herein, the first open block list may include information on a virtual open block representing one or more virtual physical storage spaces and a latest allocated virtual open offset in the virtual open block. As an example, referring to FIG. 5, the first open block list may store a first virtual open block VA_1 and a virtual open offset "50" corresponding thereto, a second virtual open block VA_2 and a virtual open offset "20" corresponding thereto, and a third virtual open block VA_3 and a virtual open offset "4" corresponding thereto. Here, since the first virtual address converted through the first address converter 161 is 'VA_1: 51', the virtual open offset corresponding to the first virtual open block in the first open block list is updated from '50' to '51'.

Then, the first address converter 161 transfers the first virtual address to the second address converter 162.

The second address converter 162 may convert the first virtual address, stored in the first temporary map table, into a physical address PA corresponding to the first virtual address. That is, the second address converter 162 may convert the first virtual address into the physical address PA representing the actual physical storage space of the memory device 150 in which the write data is to be stored. In addition, the second address converter 162 may store the first virtual address and the physical address, which has been obtained through the conversion of the first virtual address, in a second temporary map table included in the memory 144. For example, referring to FIG. 4B, it may be seen that a physical address "PA_10:5" obtained through the conversion by the second address converter 162 in correspondence with the first virtual address "VA_1:51" has been stored in the second temporary map table. That is, it may be seen that the second address converter 162 has converted the first virtual address "VA_1:51" into the physical address "PA_10:5" having the block number of 10 and the page number of 5. Herein, the controller 130 may perform the write operation in order to store data in the physical address in correspondence with a write command received from the host 102. However, whether the physical address actually indicates a free or empty page in an open block should be checked. The reason is that there is a risk of losing data when the physical address indicates a closed block or a page in which valid or invalid data is stored in an open block. Accordingly, whether the physical address actually indicates a free page in an open block should be checked. To this end, the physical address is transferred to the error checker 163 in order to check whether the physical address obtained through the conversion by the second address converter 162 is duplicated. In this disclosure, a duplicate physical address may be a physical address corresponding to a write command and indicating a closed block or a valid or invalid page in an open block. That is, a duplicate physical address may be a physical address that corresponds to a write command and causes overwrite in the memory device 150, which is non-volatile. In this disclosure, a virtual address corresponding to a duplicate physical address may be referred to as a duplicate virtual address. When a physical address is allocated in duplicate, that address is a duplicate physical address.

The error checker 163 may perform a first error checking operation of checking a mapping relationship between the first virtual address and the physical address and a second error checking operation of checking whether there is an error in the physical address in order to check whether the physical address received from the second address converter 162 is a duplicate.

Firstly, the error checker 163 converts the physical address into a virtual address so as to perform the first error checking operation. For convenience in description, the virtual address obtained through the inverse-conversion of the physical address may be referred to as a second virtual address. As an example, referring to FIG. 4C, it may be seen that the second virtual address "VA_1:51" is obtained through the inverse-conversion of the physical address "PA_10:5".

Then, the error checker 163 checks whether a virtual block number and a virtual offset number of the second virtual address are included in the updated first open block list.

The reason for checking whether the virtual block number and virtual offset number of the second virtual address are included in the first open block list is as follows.

First, when the virtual block number of the second virtual address is not included in the first open block list, it may be determined that the second virtual address has been allocated to another virtual block not in the first open block list, and the physical address corresponding to the second virtual address is regarded as a duplicate.

Second, even though the virtual block number of the second virtual address is included in the first open block list, when the virtual offset number of the second virtual address is not equal to or greater than a virtual open offset number of the virtual open block corresponding to the virtual block number of the second virtual address in the first open block list, which means that the virtual offset number of the second virtual address is a duplicate virtual offset number already taken within the virtual open block corresponding to the virtual block number of the second virtual address in the first open block list, the physical address obtained from the first virtual address may be regarded as duplicate.

Specifically, the error checker 163 checks whether the virtual block number of the second virtual address is included in the first open block list. When the check result indicates that the virtual block number of the second virtual address is not included in the first open block list, the error checker 163 transmits, to the second address converter 162, a message indicating that an error occurred in converting the first virtual address into the physical address and a request message for remapping the first virtual address to the physical address.

On the other hand, when the check result indicates that the virtual block number of the second virtual address is included in the first open block list, the error checker 163 checks whether the virtual offset number of the second virtual address is equal to or greater than a virtual open offset number of the virtual open block corresponding to the virtual block number of the second virtual address in the first open block list.

When the check result indicates that the virtual offset number of the second virtual address is not equal to or greater than the virtual open offset number of the virtual open block corresponding to the virtual block number of the second virtual address in the first open block list, the error checker 163, as described above, transmits, to the second address converter 162, a message indicating that an error occurred in converting the first virtual address into the physical address and a request message for remapping the first virtual address to the physical address.

On the other hand, when the check result indicates that the virtual offset number of the second virtual address is equal to or greater than the virtual open offset number of the virtual open block corresponding to the virtual block number of the second virtual address in the first open block list, the error checker 163 may perform the second error checking operation.

As an example, referring to FIG. 5, the updated first open block list may store a first virtual open block VA_1 and a virtual open offset "51" corresponding thereto, a second virtual open block VA_2 and a virtual open offset "20" corresponding thereto, and a third virtual open block VA_3 and a virtual open offset "4" corresponding thereto. The error checker 163 checks whether the virtual block number "VA_1" of the second virtual address "VA_1:51" is included in the first open block list. Because the check result indicates that the first virtual open block VA_1 is included in the first open block list, it may be seen that the virtual block number "VA_1" is included in the first open block list. Subsequently, the error checker 163 checks whether the virtual offset number "51" of the second virtual address "VA_1:51" is equal to or greater than the virtual open offset of the first virtual open block VA_1 in the first open block list. Because the check result indicates that the virtual offset number of the second virtual address is "51" equal to or greater than the virtual open offset of the first virtual open block VA_1, the error checker 163 may perform the second error checking operation.

Secondly, the error checker 163 may perform the second error checking operation on the physical address. The error checker 163 checks whether a block number and a page number of the physical address is included in a second open block list. The second open block list may include information on one or more physical open blocks and a latest written page number corresponding thereto. Herein, the physical open block represents a block in which substantial data is stored and a page capable of programming the data remains.

Specifically, the error checker 163 checks whether the block number of the physical address is included in the second open block list. When the block number of the physical address is not included in the second open block list, the error checker 163 determines that an error has occurred in the conversion from the logical address into the first virtual address, and transmits, to the first address converter 161, a message indicating an error occurring in converting the logical address into the first virtual address and a request message for remapping the logical address to the first virtual address.

On the other hand, when the block number of the physical address is included in the second open block list, the error checker 163 checks whether the page number of the physical address is greater than a page number of the physical open block corresponding to the block number of the physical address in the second open block list.

When the check result indicates that the page number of the physical address is greater than the page number of the physical open block corresponding to the block number of the physical address in the second open block list, the error checker 163 may update the page number of the physical open block corresponding to the block number of the physical address in the second open block list to the page number of the physical address, and then perform a write operation on a memory block corresponding to the physical address.

If the page number of the physical address indicates the last page when updating the page number of the physical open block corresponding to the block number of the physical address in the second open block list to the page number of the physical address, the error checker 163 may remove the physical open block corresponding to the block number of the physical address and the page number of the physical open block corresponding to the block number of the physical address from the second open block list at the time of performing the write operation on a page of the memory block corresponding to the physical address.

On the other hand, when the check result indicates that the page number of the physical address is equal to or smaller than the page number of the physical open block corresponding to the block number of the physical address in the second open block list, the error checker 163 determines that an error has occurred in the conversion of the logical address into the first virtual address, and then transmits, to the first address converter 161, the message indicating that an error occurred in converting the logical address into the first virtual address and the request message for remapping the logical address to the first virtual address.

For example, referring to FIG. 6, it may be seen that the second open block list stores a first physical open block PA_1 and the latest written page "5" corresponding thereto, a $10^{th}$ physical open block PA_10 and the latest written page "4" corresponding thereto, and a $20^{th}$ physical open block PA_20 and the latest written page "20" corresponding thereto. Herein, the error checker 163 checks whether the block number "PA_10" of the physical address "PA_10:5" is included in the second open block list. As the check result, it may be seen that the block number "PA_10" is included in the second open block list. Subsequently, the error checker 163 checks whether the page number "5" in the physical address "PA_10:5" is greater than the page number corresponding to the physical open block number "PA_10" of the second open block list. Since the check result indicates that the page number corresponding to the physical open block number "PA_10" of the second open block list is "4", it may be seen that the page number "5" in the physical address "PA_10:5" is a page number that has not been previously allocated. Accordingly, the controller 130 may perform the write operation on the memory block of the memory device 150 in response to the allocated physical address.

Figure 7:
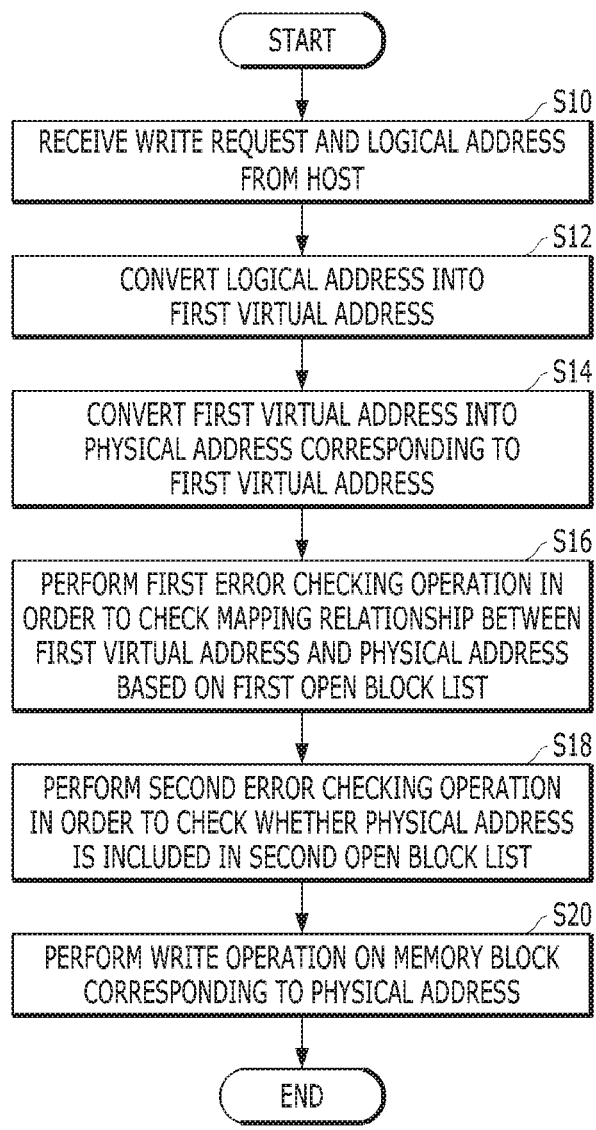
FIGS. 7 to 9 are flowcharts specifically illustrating an operating method of a memory system according to an embodiment.
Figure 8:
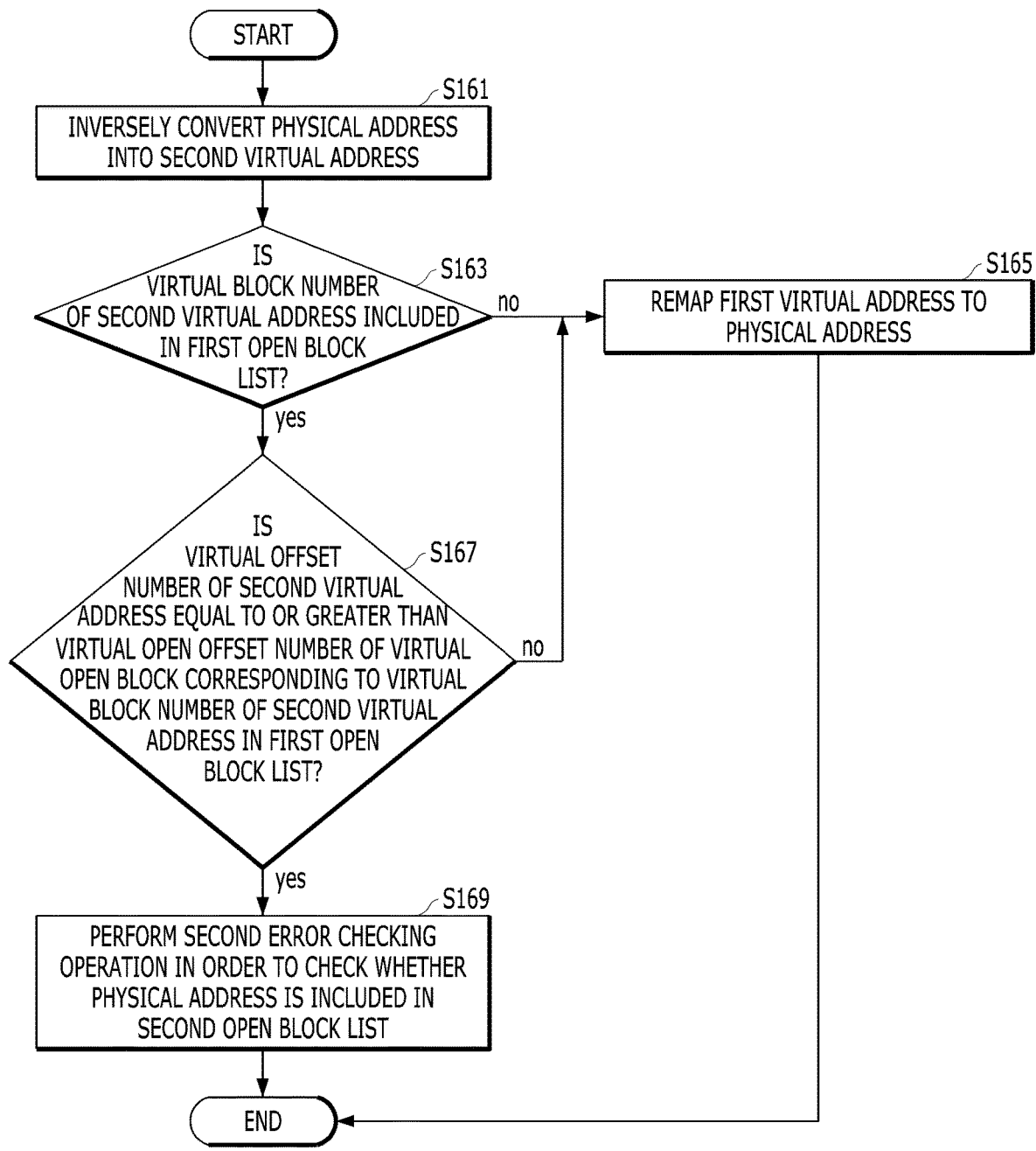
Figure 9:
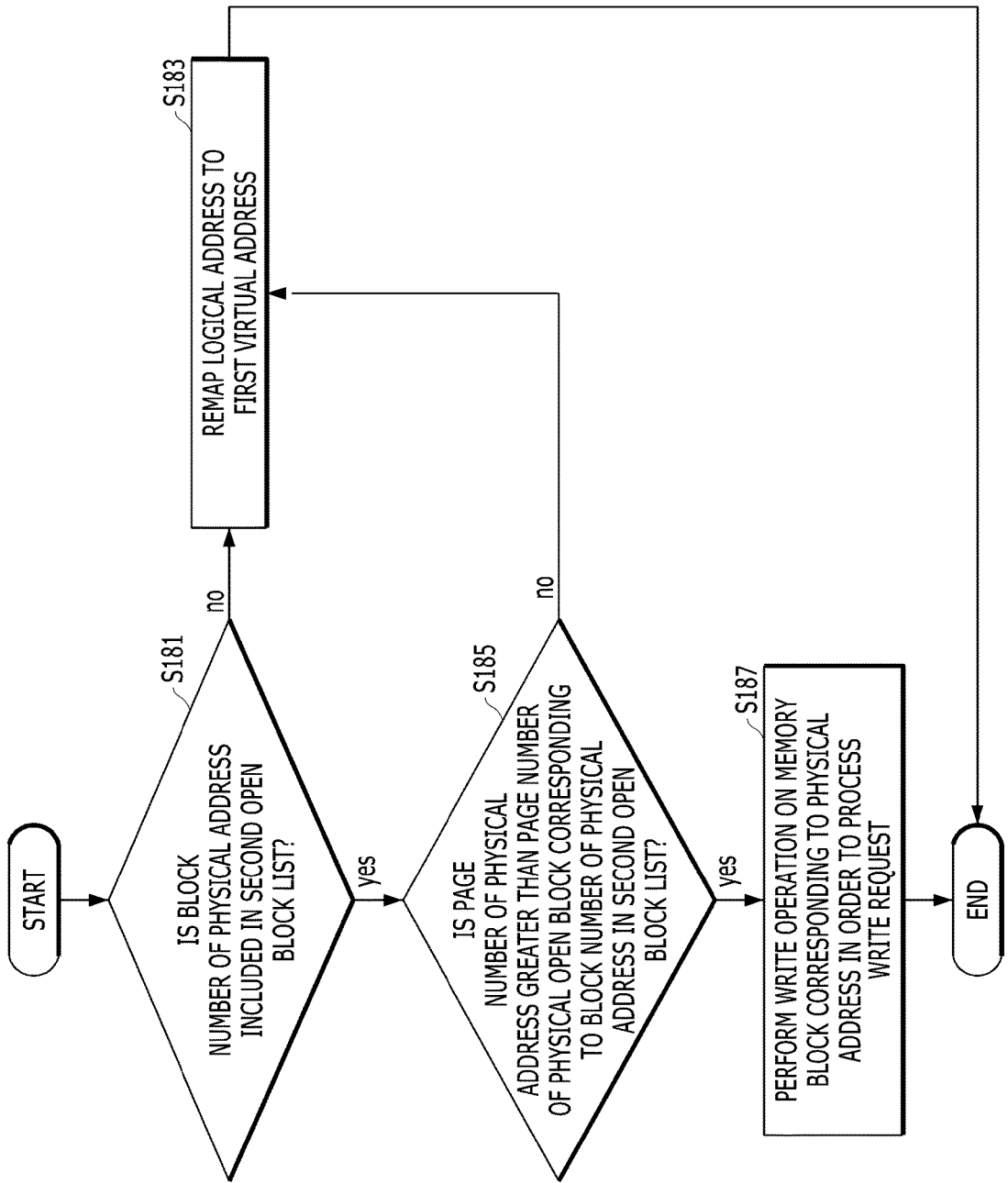

FIGS. 7 to 9 are flowcharts specifically illustrating an operating method of a memory system according to an embodiment.

Referring to FIG. 7, in step S10, the controller 130 may receive a write request and a logical address from the host 102.

In step S12, the controller 130 may convert the received logical address into a first virtual address in order to process the write request. In addition, the controller 130 may store the logical address and a first virtual address, obtained through the conversion of the logical address, in a first temporary map table included in the memory 144. The first virtual address, which represents a virtual physical storage space allocated corresponding to the logical address received from the host 102, may include a virtual block number and a virtual offset number. That is, the first virtual address is converted from the logical address.

In step S14, the controller 130 may convert the first virtual address into a physical address PA. That is, the controller 130 may convert the first virtual address into the physical address PA representing the actual physical storage space of the memory device 150 in which the write data is to be stored. In addition, the controller 130 may store the first virtual address and the physical address PA in a second temporary map table included in the memory 144.

In step S16, the controller 130 may perform a first error checking operation by checking a mapping relationship between the first virtual address and the physical address based on a first open block list, in order to check whether the physical address is allocated in duplicate. This aspect is described in detail with reference to FIG. 8.

In step S18, the controller 130 may perform a second error checking operation to check whether the physical address is included in a second open block list. This aspect is described in detail with reference to FIG. 9.

In S20, the controller 130 may perform a write operation on a memory block corresponding to the physical address, in order to process the write request received from the host 102 when it is determined that the physical address has not been allocated in duplicate, as a result of checking the same, through the first and second error checking operations performed in operations S16 and S18.

FIG. 8 is a flowchart specifically illustrating step S16 of FIG. 7.

Referring to FIG. 8, in step S161, the controller 130 performs an inverse conversion; that is, the controller 130 converts the physical address into the second virtual address in order to perform the first error checking operation.

In step S163, the controller 130 checks whether the virtual block number of the second virtual address is included in the first open block list. The first open block list may include a virtual open block indicating one or more virtual physical storage spaces and a latest allocated virtual open offset in the virtual open block. The reason why the controller 130 checks whether the virtual block number of the second virtual address is included in the first open block list is that when the virtual block number of the second virtual address is not included in the first open block list, it may be determined that the second virtual address has been allocated to another virtual block not in the first open block list, and the physical address corresponding to the second virtual address is regarded as having been allocated in duplicate.

When the check result indicates that the virtual block number of the second virtual address is not included in the first open block list (that is, "NO" in step S163), the controller 130 may perform step S165. In step S165, the controller 130 determines that an error occurred in converting the first virtual address into the physical address and remaps the first virtual address to the physical address.

When the check result indicates that the virtual block number of the second virtual address is included in the first open block list (that is, "YES" in step S163), the controller 130 may perform step S167. In step S167, the controller 130 checks whether the virtual offset number of the second virtual address is equal to or greater than a virtual open offset number of the virtual open block corresponding to the virtual block number of the second virtual address in the first open block list. The reason why the controller 130 checks whether the virtual offset number of the second virtual address is equal to or greater than the virtual open offset number of the virtual open block corresponding to the virtual block number of the second virtual address in the first open block list is that, even though the virtual block number of the second virtual address is included in the first open block list, when the virtual offset number of the second virtual address is not equal to or greater than the virtual open offset number of the virtual open block corresponding to the virtual block number of the second virtual address in the first open block list, which means that the virtual offset number of the second virtual address is a duplicate virtual open offset number already taken within the virtual open block corresponding to the virtual block number of the second virtual address in the first open block list, the physical address obtained from the first virtual address may be regarded as duplicate. That is, it may be determined that the physical address obtained through the conversion using the first virtual address has been allocated in duplicate.

When the check result indicates that the virtual offset number of the second virtual address is not equal to or greater than the virtual open offset number of the virtual open block corresponding to the virtual block number of the second virtual address in the first open block list (that is, "NO" in step S167), the controller 130 may perform step S165. As described above, the controller 130 determines that an error has occurred in the conversion from the first virtual address into the physical address and remaps the first virtual address to the physical address.

On the other hand, when the check result indicates that the virtual offset number of the second virtual address is equal to or greater than the virtual open offset number of the virtual open block corresponding to the virtual block number of the second virtual address in the first open block list (that is, "YES" in step S167), the controller may perform step S169. In step S169, the controller 130 performs a second error checking operation so as to check whether the physical address is included in the second open block list. The second error checking operation will be described in detail with reference to FIG. 9.

FIG. 9 is a flowchart specifically illustrating step S18 of FIG. 7.

Referring to FIG. 9, the controller 130 checks whether the physical address is included in the second open block list, in order to perform the second error checking operation on the physical address. The second open block list may include one or more physical open blocks and a latest written page number in each of the physical open blocks. The physical open block represents a block in which substantial data is stored and a page capable of programming the data remains.

Specifically, in step S181, the controller 130 checks whether the block number of the physical address is included in the second open block list.

When the check result indicates that the block number of the physical address is not included in the second open block list (that is, "NO" in step S181), the controller 130 may perform step S183. In step S183, the controller 130 determines that an error has occurred in the conversion of the logical address into the first virtual address, and remaps the logical address to the first virtual address.

On the other hand, when the check result indicates that the block number of the physical address is included in the second open block list (that is, "YES" in step S181), the controller 130 may perform step S185. In step S185, the controller 130 checks whether the page number of the physical address is greater than a page number of the physical open block corresponding to the block number of the physical address in the second open block list.

When the check result indicates that the page number of the physical address is greater than the page number of the physical open block corresponding to the block number of the physical address in the second open block list (that is, "YES" in step S185), the controller 130 may perform S187. In step S187, the controller 130 may update the page number of the physical open block corresponding to the block number of the physical address in the second open block list to the page number of the physical address, and then perform the write operation on a memory block corresponding to the physical address, in order to process the write request. If the page number of the physical address indicates the last page when updating the page number of the physical open block corresponding to the block number of the physical address in the second open block list to the page number of the physical address, the controller 130 may remove the physical open block corresponding to the block number of the physical address and the page number of the physical open block corresponding to the block number of the physical address from the second open block list at the time of performing the write operation on the page of the memory block corresponding to the physical address.

On the other hand, when the check result indicates that the page number of the physical address is not greater than the page number of the physical open block corresponding to the block number of the physical address in the second open block list (that is, "NO" in step S185), the controller 130 may perform step S183. In step S183, the controller 130 determines that an error has occurred in the conversion from the logical address into the first virtual address, and remaps the logical address to the first virtual address.

According to embodiments of the present disclosure, data corruption attributable to overwriting of a memory device may be prevented by checking whether there is an error in a physical address, after checking a mapping relationship between a corresponding virtual address of a logical address stored in a volatile memory and a physical address corresponding to the virtual address.

The effects and advantages obtainable from the present disclosure are not limited to those described herein. Other effects and advantages will be understood by those skilled in the art, to which the present disclosure pertains, from the above detailed description.

While specific embodiments have been illustrated and described, it will be apparent to those skilled in the art that various changes and modifications may be made without departing from the scope of the disclosure. Therefore, the scope of the present invention is not limited to or by any of the described embodiments. Rather, the present invention encompasses all variations of any of the disclosed embodiments that fall within the scope of the claims including their equivalents.

What is claimed is:

1. A memory system comprising:
   a memory device including a plurality of blocks; and
   a controller configured to perform a write operation on an open block among the plurality of blocks in correspondence with a write request and a logical address received from a host, and including a memory in which a first open block list including one or more pieces of virtual open block information and a second open block list including one or more pieces of physical open block information are stored,
   wherein, before performing the write operation, the controller converts the logical address into a first virtual address, converts the first virtual address into a physical address, performs a first error checking operation of checking a mapping relationship between the first virtual address and the physical address based on the first open block list and a second error checking operation of checking whether the physical address is included in the second open block list, in order to check whether the physical address is allocated more than once,
   wherein the controller then performs the write operation on the physical open block corresponding to the physical address when it is determined that the physical address is not allocated more than once.

2. The memory system of claim 1, wherein the first open block list includes information on a virtual open block indicating one or more virtual physical storage spaces and a latest allocated virtual open offset in the virtual open block.

3. The memory system of claim 1,
   wherein the second open block list includes information on one or more physical open blocks and a latest written page number among a plurality of pages within each of the physical open blocks, and
   wherein each of the physical open blocks includes at least one page capable of programming data, among the plurality of blocks in the memory device.

4. The memory system of claim 1,
   wherein the controller converts the physical address into a second virtual address, and
   wherein the controller performs the first error checking operation by checking whether a virtual block number of the second virtual address is included in the first open block list.

5. The memory system of claim 4, wherein the controller determines that an error has occurred in converting the first virtual address into the physical address, and remaps the first virtual address to the physical address, when the virtual block number of the second virtual address is not included in the first open block list, and
   checks whether a virtual offset number of the second virtual address is equal to or greater than a virtual open offset number of a virtual open block corresponding to the virtual block number of the second virtual address in the first open block list, when the virtual block number of the second virtual address is included in the first open block list.

6. The memory system of claim 5,
   wherein the controller determines that an error has occurred in converting the first virtual address into the physical address and remaps the first virtual address into the physical address when the virtual offset number of the second virtual address is not equal to greater than the virtual open offset number of the virtual open block corresponding to the virtual block number of the second virtual address in the first open block list, and
   wherein the controller performs the second error checking operation when the virtual offset number of the second virtual address is equal to or greater than the virtual open offset number of the virtual open block corresponding to the virtual block number of the second virtual address in the first open block list.

7. The memory system of claim 1, wherein, in performing the second error checking operation, the controller checks whether a block number of the physical address is included in the second open block list.

8. The memory system of claim 7, wherein, in performing the second error checking operation, the controller determines that an error has occurred in converting the logical address into the first virtual address, and remaps the logical address to the first virtual address, when the block number of the physical address is not included in the second open block list, and
   checks whether a page number of the physical address is greater than a page number of a physical open block corresponding to the block number of the physical address in the second open block list when the block number of the physical address is included the second open block list.

9. The memory system of claim 8,
   wherein the controller determines that an error has occurred in converting the logical address into the first virtual address, and remaps the logical address to the first virtual address, when the page number of the physical address is equal to or less than the page number of the physical open block corresponding to the block number of the physical address in the second open block list, and
   wherein the controller performs the write operation on a memory block corresponding to the physical address when the page number of the physical address is greater than the page number of the physical open block corresponding to the block number of the physical address in the second open block list.

10. The memory system of claim 9, wherein the controller updates the page number of the physical open block corresponding to the block number of the physical address to the page number of the physical address, when performing the write operation on the memory block corresponding to the physical address in a case where the page number of the physical address is greater than the page number of the physical open block in the second open block list, and removes the physical open block corresponding to the block number of the physical address and the page number of the physical open block corresponding to the block number of the physical address from the second open block list in a case where the page number of the physical address indicates a last page in the physical open block.

11. An operating method of a memory system that includes a memory device including a plurality of blocks and a controller including a memory in which a first open block list of one or more pieces of virtual open block information and a second open block list of one or more pieces of physical open block information are stored, the operating method comprising:
receiving a write request and a logical address from a host;
converting the logical address into a first virtual address;
converting the first virtual address into a physical address;
performing a first error checking operation of checking a mapping relationship between the first virtual address and the physical address based on the first open block list;
performing a second error checking operation of checking whether the physical address is included in the second open block list; and
performing a write operation on an open block corresponding to the physical address when it is determined that the physical address is not allocated more than once.

12. The operating method of claim 11, wherein the first open block list includes information on a virtual open block indicating one or more virtual physical storage spaces and a latest allocated virtual open offset in the virtual open block.

13. The operating method of claim 11,
wherein the second open block list includes information on one or more physical open blocks and a latest written page number among a plurality of pages in each of the physical open blocks, and
wherein each of the physical open blocks includes at least one page capable of programming data, among the plurality of blocks in the memory device.

14. The operating method of claim 11, further comprising:
in the performing of the first error checking operation, converting the physical address into a second virtual address, and checking whether a virtual block number of the second virtual address is included in the first open block list.

15. The operating method of claim 14, further comprising:
determining that an error has occurred in converting the first virtual address into the physical address, and remapping the first virtual address to the physical address, when the virtual block number of the second virtual address is not included in the first open block list, and
checking whether a virtual offset number of the second virtual address is equal to or greater than a virtual open offset number of a virtual open block corresponding to the virtual block number of the second virtual address in the first open block list, when the virtual block number of the second virtual address is included in the first open block list.

16. The operating method of claim 15, further comprising:
remapping the first virtual address into the physical address when the virtual offset number of the second virtual address is not equal to or greater than virtual open offset number of the virtual open block corresponding to the virtual block number of the second virtual address in the first open block list, and
wherein the second error checking operation is performed when the virtual offset number of the second virtual address is equal to or greater than the virtual open offset number of the virtual open block corresponding to the virtual block number of the second virtual address in the first open block list.

17. The operating method of claim 11, wherein the performing of the second error checking operation includes checking whether a block number of the physical address is included in the second open block list.

18. The operating method of claim 17, wherein the performing of the second error checking operation includes
determining that an error has occurred in converting the logical address into the first virtual address and remapping the logical address to the first virtual address when the block number of the physical address is not included in the second open block list, and
checking whether a page number of the physical address is greater than a page number of a physical open block corresponding to the block number of the physical address in the second open block list when the block number of the physical address is included in the second open block list.

19. The operating method of claim 18,
wherein the determining and the remapping is performed when the page number of the physical address is not greater than the page number of the physical open block corresponding to the block number of the physical address in the second open block list, and
the write operation is performed on the memory block corresponding to the physical address when the page number of the physical address is greater than the page number of the physical open block corresponding to the block number of the physical address in the second open block list.

20. The operating method of claim 19, wherein the performing of the write operation includes:
updating the page number of the physical open block corresponding to the block number of the physical address to the page number of the physical address, and
removing the physical open block corresponding to the block number of the physical address and the page number of the physical open block corresponding to the block number of the physical address from the second open block list in a case where the page number of the physical address indicates a last page within the physical open block.

* * * * *